Nov. 5, 1963  H. L. LINCOLN  3,109,453
VALVE PLUG FOR WATER SOFTENER
Filed Aug. 4, 1961
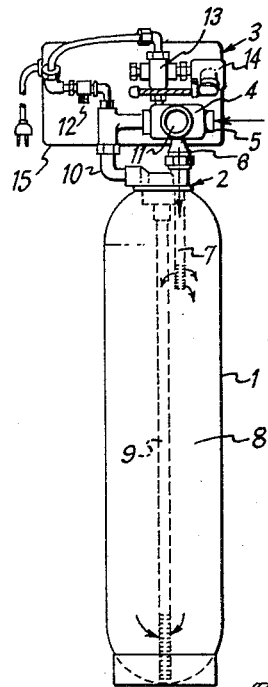
Fig. 1
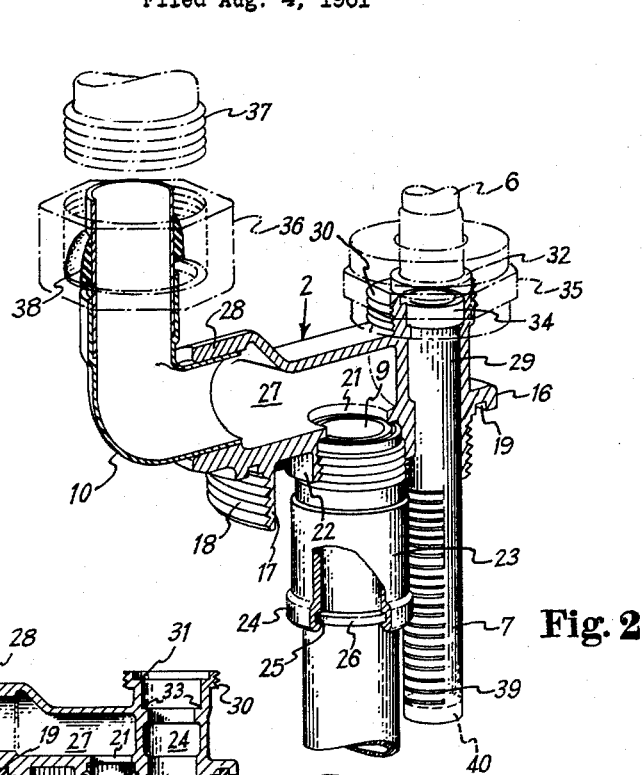
Fig. 2
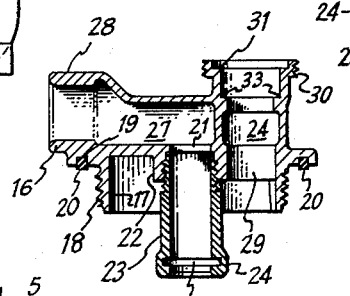
Fig. 4
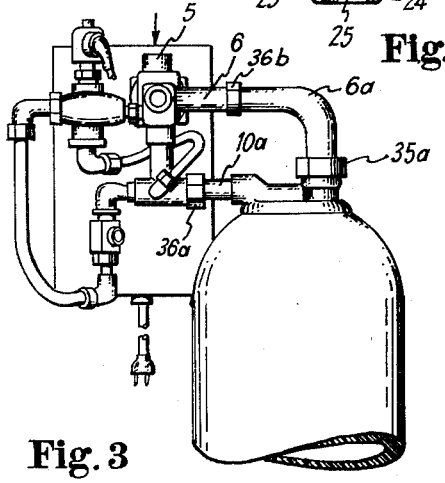
Fig. 3
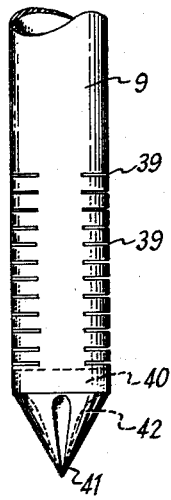
INVENTOR.
HUBERT L. LINCOLN,
BY *Allen & Allen*
ATTORNEYS.

3,109,453
VALVE PLUG FOR WATER SOFTENER
Hubert L. Lincoln, Eaton, Ohio, assignor to Link-O-Matic Company, Inc., Richmond, Ind., a corporation of Indiana
Filed Aug. 4, 1961, Ser. No. 129,431
1 Claim. (Cl. 137—590)

This invention relates to water softening equipment and more particularly to the type of water softening unit wherein the water to be softened is caused to flow through a tank containing a filtering material effective to react chemically with the water to remove mineral matter, particularly calcium which is a principal constituent of hard water. In such systems, the filter material in the tank is periodically washed with a brine solution (sodium chloride) which reacts chemically with the calcium entrapped in the filter material to form calcium chloride which is then flushed from the tank, whereupon the tank is rinsed to remove residual sodium chloride.

A principal difficulty encountered in such units, particularly those adapted for home use, lies in the difficulty of cleaning the inlet tube which projects downwardly into the tank. Heretofore, it has been necessary to disassemble the entire unit in order to remove and clean the inlet tube which is in the nature of a strainer for the incoming water. This has been a source of considerable inconvenience to the user, particularly since the services of a plumber are generally required.

In contrast to the foregoing, a principal object of the instant invention is the provision of a valve plug assembly for a water softener tank which may be readily disconnected from the valve assembly and the inlet tube exposed for cleaning or replacement.

A further object of the instant invention is the provision of an improved valve tank plug assembly incorporating a novel form of both inlet and outlet tubes which tubes are both attached to the valve plug in a way which permits their ready removal.

Still a further object of the instant invention is the provision of a tank valve plug which is readily adapted for either top or side mounting of the associated valve mechanism and controls.

The foregoing, together with other objects of the instant invention which will appear hereinafter or which will be apparent to the skilled worker in the art upon reading this specification, I accomplish by that construction and arrangement of parts of which I shall now describe an exemplary embodiment, reference being made to the accompanying drawings wherein:

FIGURE 1 is an elevational view of a water softening system in accordance with the instant invention.

FIGURE 2 is an enlarged perspective view with parts broken away illustrating the tank valve plug and the associated tubes and fittings.

FIGURE 3 is a fragmentary elevational view similar to FIGURE 1 but illustrating the side mounting of the control valve mechanism.

FIGURE 4 is a vertical sectional view of the valve plug.

Referring first to FIGURE 1, I have therein illustrated a water softening unit comprising a tank 1 the top of which is closed by a tank valve plug 2 to which is mounted a conventional control mechanism 3 including a valve system 4. In such system, the water to be softened enters the unit through the inlet port 5, flows downwardly through pipe 6 and inlet water supply tube 7 into the filter tank 1 where it passes through the filter bed 8. An outlet water supply tube 9 extends lengthwise of the tank, with the filtered water entering the tube 9 at the lower end thereof and passing upwardly through outlet pipe 10 to the valve system, the treated water passing from the valve system through outlet port 11 which, it will be understood, is connected to the household water supply line. The control mechanism will also include a connection 12 adapted to be operatively connected to a brine tank (not shown), the valve system including valve means 13 by means of which the brine solution may be washed through the tank 1. The setting of the valve system 4 may be either manual or automatic; and in the embodiment illustrated the valve system is controlled automatically by means including a solenoid 14 and time cycle mechanism contained within the rectangular housing 15.

Referring next to FIGURES 2 and 4, the valve plug 2 comprises a unitary casting, preferably formed of brass, having an essentially circular cap 16 having a depending annular flange 17 which is externally threaded at 18 so that it may be engaged with the internally threaded opening in the top of the tank 1. Preferably, an annular channel 19 will be formed in the under surface of the caps 16 into which a tank engaging washer 20 is fitted.

The cap 16 has a centrally disposed opening 21 therein surrounded by an internally threaded flange 22 into which a sleeve 23 is fitted, the sleeve terminating at its lower end in a tube guide bushing 24 having an internal O ring tube seal groove 25 mounting an O ring 26 which makes sealing engagement with the upper end of the outlet tube 9. The outlet tube 9 is slidably received within the sleeve 23 and is held tightly therein by the O ring 26 which effects a sealed connection. Thus, the tube 9 may be readily installed and removed simply by effecting axial movement thereof.

A passageway 27 overlies and is in communication with the opening 21 and hence with the outlet tube 9, the passageway 27 terminating in a pipe connection 28 into which the pipe 10 or other similar pipe fitting may be inserted and soldered in place. In the embodiment illustrated in FIGURES 1 and 2, the pipe fitting is in the form of an elbow which, as will be explained more fully hereinafter, is received by a pipe union connection forming a part of the valve system.

The valve plug is also provided with a vertical bore 29 displaced outwardly from the opening 21 and sleeve 23, the vertical bore terminating upwardly in a pipe union connection 30. The bore 29 has a first recessed shoulder 31 into which the washer 32 is fitted; and a second recessed shoulder 33 is displaced downwardly therefrom and receives the enlarged head 34 of the inlet tube 7. Preferably, the head 34 may be in the nature of a gasket or washer member affixed to the uppermost end of the inlet tube 7. In any event, the inlet tube 7 is of a size to just nicely pass downwardly through the bore 29 and retained therein by means of the head 34 as it seats against shoulder 33. With this arrangement, the inlet tube 7 may be readily removed for cleaning purposes.

It is to be understood that the pipe union connection 30 will be engaged by a suitable threaded connector 35 which will seal the lower end of pipe 6 leading from the valve system 4 to the inlet tube 7. Similarly a threaded connector 36 will serve to seal the pipe or joint 10 to the union 37 which forms a part of the valve system 4. The threaded connector 36 may be of the type which contains a compressible gasket member 38 which, as the connector 36 is tightened on the union 37, will make sealing contact therewith and with the pipe 10.

In any event, both the connectors 35 and 36 are readily detachable to disconnect the vale plug from the valve system so that user has only to uncouple connector 35 from pipe union connection 30 and loosen connector 36 sufficiently to permit the tank 1 and the associated valve plug 2 to be pivoted or turned relative to the connector 36, thereby exposing the inlet tube 7 for removal. It is not necessary to completely disconnect the connector 36 from the union 37 since it is only necessary to pivot or turn the tank 1 by an amount sufficient to clear the pipe 6 and hence expose the inlet tube 7 for removal. After the inlet tube has been removed and either cleaned or replaced, the user has simply to pivot the tank 1 to its initial position with the union 30 underlying the connector 35, whereupon the connectors 35 and 36 can be retightened and the unit returned to service. Thus, it is not necessary to remove the valve plug 2 from the tank in order to clean or replace the inlet tube 7, which is a primary source of difficulty insofar as cleaning is concerned.

FIGURE 3 illustrates how the valve plug just described may be conveniently applied to a valve system mounted at right angles to the position illustrated in FIGURE 1. In this instance, the pipe 10a is straight and is joined to the valve system by a connector 36a. The connector 35a, on the other hand, engages an elbow 6a, which may be an extension of pipe 6; but as before, the connections 35a and 36a may be readily disengaged to permit ready access to the bore 29 and the inlet tube 7 contained therein. If desired, a connector 36b which is identical to connector 36a, may be provided between pipe 6 and the elbow extension 6a, thereby permitting the elbow section 6a to be pivoted relative to the valve plug once the connector 35a has been disengaged.

Preferably the inlet and outlet tubes 7 and 9, respectively, will be formed from a plastic material; and an integral strainer is provided by cutting spaced apart sets of slits 39 in opposite sides of the tubes. It will be understood that the bottom or free ends of the tubes will be closed, as by means of plugs 40. In the case of the outlet tube 9 which extends all the way to the bottom of the tank 1, it is preferred to taper or point the plug, as at 41, and also provide spaced apart longitudinally extending indentations or pockets 42 which will assist in working the tube downwardly through the filter material 8 contained in the tank.

From the foregoing, it should be apparent that the instant invention provides a highly useful valve plug which may be utilized in conjunction with a water softening unit in such fashion that the inlet tube may be readily removed and either cleaned or replaced without removing the valve plug or disassembling the entire system. In addition, the valve plug itself may be readily removed should the outlet tube 9 require attention; and here again, it is only necessary to move the tube 9 axially to free it from the valve plug.

Having thus described the invention in certain exemplary embodiments, and with the understanding that modification may be made without departing from its spirit and purpose, what is desired to be secured and protected by Letters Patent is:

In a water softening unit wherein a valve system having inlet and outlet lines is operatively connected to a filter tank by means of a single valve plug, an improved valve plug assembly consisting of a one-piece body terminating on its under side in a screw cap adapted to be threaded into the top opening in a filter tank, a pair of passageways in said body each opening downwardly through said cap so as to be in communication with the interior of the tank, a first of said passageways having a horizontally disposed portion terminating outwardly in a pipe union connection by means of which the said first passageway may be detachably connected to one of the lines of the valve system, the horizontally disposed portion of said first passageway terminating inwardly at the center of said cap portion in a circular opening extending downwardly through said cap, an annular flange surrounding and projecting downwardly from said circular opening, a downwardly projecting sleeve secured to said annular flange, said sleeve having an internal bore of a size to slidably receive a water supply tube, said sleeve terminating adjacent its lowermost free end in a tube guide bushing having an annular groove in its inner surface for mounting an O-ring tube seal, the second of said passageways comprising a vertical bore laterally disposed with respect to said first passageway, said vertical bore extending through said body and cap and being of a size to slidably receive a second water supply tube which extends downwardly within the tank, said bore having a shoulder therein against which an enlarged head on the upper end of said tube seats when said tube is inserted in said bore, said bore terminating upwardly in a pipe union connection by means of which said bore and tube therein may be detachably connected to another of the lines of the valve system.

References Cited in the file of this patent

UNITED STATES PATENTS

| | | |
|---|---|---|
| 2,572,082 | Welsh | Oct. 23, 1951 |
| 2,863,559 | Schulze | Dec. 9, 1958 |
| 2,973,097 | Snider | Feb. 28, 1961 |